United States Patent
Lu

(10) Patent No.: US 9,572,034 B1
(45) Date of Patent: Feb. 14, 2017

(54) SYSTEMS AND METHODS FOR SECURING WIRELESS NETWORKS

(71) Applicant: Symantec Corporation, Mountain View, CA (US)

(72) Inventor: Jin Lu, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/849,623

(22) Filed: Sep. 10, 2015

(51) Int. Cl.
   *H04W 12/08* (2009.01)
   *H04L 29/06* (2006.01)
   *H04W 12/06* (2009.01)

(52) U.S. Cl.
   CPC .......... *H04W 12/08* (2013.01); *H04L 63/0281* (2013.01); *H04L 63/04* (2013.01); *H04L 63/083* (2013.01); *H04W 12/06* (2013.01)

(58) Field of Classification Search
   CPC .................................................... H04W 12/08
   See application file for complete search history.

(56) References Cited

U.S. PATENT DOCUMENTS

| 8,107,414 | B2 * | 1/2012 | Wang | H04W 84/20 370/328 |
| 2005/0198337 | A1 * | 9/2005 | Sun | H04W 36/0016 709/230 |
| 2005/0261970 | A1 * | 11/2005 | Vucina | G06Q 20/20 705/16 |
| 2007/0025371 | A1 * | 2/2007 | Krantz | H04L 12/5692 370/401 |
| 2007/0026856 | A1 * | 2/2007 | Krantz | H04W 48/08 455/426.1 |
| 2007/0061458 | A1 * | 3/2007 | Lum | H04L 61/2015 709/225 |
| 2009/0310535 | A1 * | 12/2009 | Anumala | H04W 8/26 370/328 |
| 2010/0124213 | A1 * | 5/2010 | Ise | H04W 12/06 370/338 |

(Continued)

OTHER PUBLICATIONS

Chen at al.; Virtual smartphone over IP; Published in: World of Wireless Mobile and Multimedia Networks (WoWMoM), 2010 IEEE International Symposium on a; Date of Conference: Jun. 14-17, 2010; IEEE Xplore.*

(Continued)

*Primary Examiner* — Bradley Holder
(74) *Attorney, Agent, or Firm* — FisherBroyles LLP

(57) ABSTRACT

The disclosed computer-implemented method for securing wireless networks may include (1) receiving, at a physical access point, a request to improve the security of a wireless network that includes a client device and is serviced by an active virtual access point of the physical access point, (2) configuring a substitute virtual access point to service the wireless network by (a) configuring the substitute virtual access point to identify the wireless network using a substitute SSID and/or (b) secure the wireless network using a substitute passcode, (3) transmitting a notification that includes the substitute SSID and/or the substitute passcode to the client device that instructs the client device to connect to the wireless network via the substitute virtual access point, (4) connecting the client device to the substitute virtual access point, and (5) disabling the active virtual access point. Various other methods, systems, and computer-readable media are also disclosed.

20 Claims, 9 Drawing Sheets

(56) References Cited

U.S. PATENT DOCUMENTS

| | | | | |
|---|---|---|---|---|
| 2011/0264730 | A1* | 10/2011 | Dattagupta | H04L 12/2809 709/203 |
| 2012/0317619 | A1* | 12/2012 | Dattagupta | H04W 12/08 726/4 |
| 2013/0039213 | A1* | 2/2013 | Averbuch | H04L 67/34 370/254 |
| 2014/0126466 | A1* | 5/2014 | Hamdi | H04W 24/02 370/328 |
| 2015/0046622 | A1* | 2/2015 | Ramirez | G06F 13/409 710/303 |
| 2015/0046623 | A1* | 2/2015 | Ramirez | G06F 13/409 710/303 |
| 2015/0046624 | A1* | 2/2015 | Ramirez | G06F 13/409 710/303 |
| 2016/0241702 | A1* | 8/2016 | Gorajala Chandra | H04M 1/72533 |
| 2016/0249315 | A1* | 8/2016 | Venkatraman | H04W 64/00 |

OTHER PUBLICATIONS

Roth et al.; Simple and effective defense against evil twin access points; Published in: Proceeding WiSec '08 Proceedings of the first ACM conference on Wireless network security; 2008; pp. 220-235; ACM Digital Library.*

"Linksys User Guide—LAPAC1200 AC1200 Dual Band Access Point", http://downloads.linksys.com/downloads/userguide/1224701665704/MAN_LAPAC1200_LNKPG-00114_RevA00_User_Guide.pdf, as accessed Aug. 3, 2015, Belkin International, Inc., (2014).

Natarajan, Ramesh, "6 Steps to Secure Your Home Wireless Network", http://www.thegeekstuff.com/2008/08/6-steps-to-secure-your-home-wireless-network/, as accessed Aug. 3, 2015, (Aug. 7, 2008).

Geier, Eric, "Implementing Inexpensive Multiple SSID Networks: Part I", http://www.wi-fiplanet.com/tutorials/article.php/3710791, as accessed Aug. 3, 2015, (Nov. 13, 2007).

Geier, Eric, "Set Up Multiple SSIDs and VLANs on a DD-WRT Router", http://www.ciscopress.com/articles/article.asp?p=1730493, as accessed Aug. 3, 2015, (Jul. 19, 2011).

"How are multiple SSID's handled on same access point?", http://networkengineering.stackexchange.com/questions/2666/how-are-multiple-ssids-handled-on-same-access-point, as accessed Aug. 3, 2015, (Aug. 6, 2013).

* cited by examiner

SYSTEMS AND METHODS FOR SECURING WIRELESS NETWORKS

BACKGROUND

Today, wireless networks are becoming a preferred way to connect devices to one another and the Internet. Wireless access points may provide the necessary services that form the infrastructure of a wireless network. In a typical configuration, a wireless access point may use a Service Set Identifier (SSID) to (1) identify a wireless network and (2) enable client devices to identify and connect to the wireless network. In addition, a typical wireless access point may use a passcode (e.g., a pre-shared key like a password) to secure access to the wireless network.

In many situations (e.g., many home-based scenarios), a wireless access point may be configured to service a wireless network using a SSID and passcode that is used for the life of the wireless network and never or seldom changed. Unfortunately, when SSIDs and passcodes are not changed regularly, the security of the wireless network may be reduced or compromised. However, typical techniques for changing SSIDs and passcodes used by conventional wireless access points may be tedious and error-prone. Moreover, many typical techniques for changing SSIDs and passcodes used by conventional wireless access points may cause the wireless networks of the wireless access points to become temporarily unavailable. The instant disclosure, therefore, identifies and addresses a need for improved systems and methods for securing wireless networks.

SUMMARY

As will be described in greater detail below, the instant disclosure describes various systems and methods for securing wireless networks. In one example, a computer-implemented method for securing wireless networks may include (1) receiving, at a physical access point, a request to improve the security of a wireless network that (a) includes a client device and (b) is serviced by an active virtual access point running on the physical access point, (2) configuring, at the physical access point, a substitute virtual access point to service the wireless network by (a) configuring the substitute virtual access point to identify the wireless network using a substitute SSID (e.g., a SSID that is different than that used by the active virtual access point to identify the wireless network) and/or (b) configuring the substitute virtual access point to secure the wireless network using a substitute passcode (e.g., a passcode that is different than that used by the active virtual access point to secure the wireless network), (3) transmitting a notification that includes the substitute SSID and/or the substitute passcode to the client device that instructs the client device to connect to the wireless network via the substitute virtual access point, (4) connecting, at the physical access point, the client device to the wireless network via the substitute virtual access point, and (5) disabling the active virtual access point. In some embodiments, the physical access point may be capable of running multiple virtual access points that share physical resources of the physical access point, and the active virtual access point may identify the wireless network using a SSID and may secure the wireless network using a passcode.

In some embodiments, the step of configuring the substitute virtual access point to service the wireless network may include (1) configuring the substitute virtual access point to identify the wireless network using the substitute SSID instead of the SSID and (2) configuring the substitute virtual access point to secure the wireless network using the substitute passcode instead of the passcode.

In some embodiments, the step of configuring the substitute virtual access point to service the wireless network may include (1) configuring the substitute virtual access point to identify the wireless network using the substitute SSID instead of the SSID and (2) configuring the substitute virtual access point to secure the wireless network using the passcode.

In some embodiments, the step of configuring the substitute virtual access point to service the wireless network may include (1) configuring the substitute virtual access point to identify the wireless network using the SSID and (2) configuring the substitute virtual access point to secure the wireless network using the substitute passcode instead of the passcode.

In some embodiments, the step of receiving the request to improve the security of the wireless network may include detecting abnormal behavior on the wireless network. In some embodiments, the step of receiving the request to improve the security of the wireless network may include determining that a predetermined amount of time has passed since the active virtual access point was configured to identify the wireless network using the SSID. In some embodiments, the step of receiving the request to improve the security of the wireless network may include determining that a predetermined amount of time has passed since the active virtual access point was configured to secure the wireless network using the passcode.

In some embodiments, the client device may be connected to the wireless network when the notification is transmitted to the client device, and the step of transmitting the notification to the client device may include transmitting, via the active virtual access point, the notification to the client device. In some embodiments, the active virtual access point may be disabled after the client device is connected to the substitute virtual access point. In some embodiments, the step of transmitting the notification to the client device may include transmitting, via the Internet, the notification to the client device. In some embodiments, the active virtual access point may be disabled before the client device is connected to the substitute virtual access point. In some embodiments, the step of configuring the substitute virtual access point to service the wireless network may include configuring the substitute virtual access point to not broadcast the substitute SSID in an unencrypted state.

In one embodiment, a system for implementing the above-described method may include (1) a receiving module, stored in memory, that receives, at a physical access point, a request to improve the security of a wireless network that (a) includes at least one client device and (b) is serviced by an active virtual access point running on the physical access point, (2) a configuring module, stored in memory, that configures, at the physical access point, a substitute virtual access point to service the wireless network by (a) configuring the substitute virtual access point to identify the wireless network using a substitute SSID and/or (b) configuring the substitute virtual access point to secure the wireless network using a substitute passcode, (3) a transmitting module, stored in memory, that transmits a notification that includes the substitute SSID and/or the substitute passcode to the client device that instructs the client device to connect to the wireless network via the substitute virtual access point, (4) a connecting module, stored in memory, that connects, at the physical access point, the client device to the wireless network via the substitute virtual access point, (5) a disabling module, stored in memory, that disables the active virtual access point, and (6) at least one processor that executes the receiving module, the configuring module, the transmitting module, the connecting module, and the disabling module. In some embodiments, the physical access point may be capable of running multiple virtual access points that share physical resources of the physical access point, and the active virtual access point may identify the wireless network using a SSID and may secure the wireless network using a passcode.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a physical access point, a request to improve the security of a wireless network that (a) includes a client device and (b) is serviced by an active virtual access point running on the physical access point, (2) configure, at the physical access point, a substitute virtual access point to service the wireless network by (a) configuring the substitute virtual access point to identify the wireless network using a substitute SSID and/or (b) configuring the substitute virtual access point to secure the wireless network using a substitute passcode, (3) transmit a notification that includes the substitute SSID and/or the substitute passcode to the client device that instructs the client device to connect to the wireless network via the substitute virtual access point, (4) connect, at the physical access point, the client device to the wireless network via the substitute virtual access point, and (5) disable the active virtual access point. In some embodiments, the physical access point may be capable of running multiple virtual access points that share physical resources of the physical access point, and the active virtual access point may identify the wireless network using a SSID and may secure the wireless network using a passcode.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
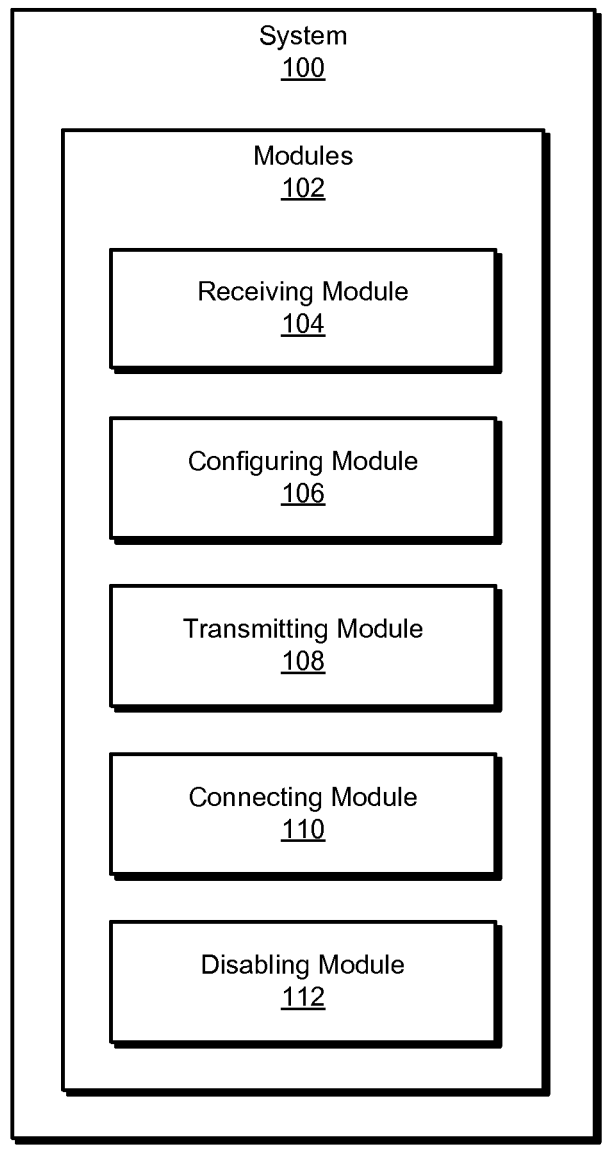
FIG. 1 is a block diagram of an exemplary system for securing wireless networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for securing wireless networks. As will be explained in greater detail below, by enabling client devices that are connected to a wireless network via an active virtual access point that (a) identifies the wireless network using an active SSID and/or (b) secures the wireless network using an active passcode to migrate to a substitute virtual access point that (a) identifies the wireless network using a substitute SSID and/or (b) secures the wireless network using a substitute passcode, the systems and methods described herein may seamlessly change SSIDs and passcodes of wireless networks with little to no intervention from users and with little to no disruption of network traffic. Embodiments of the instant disclosure may also provide various other advantages and features, as discussed in greater detail below.

The following will provide, with reference to FIGS. 1-2 and 4-7, detailed descriptions of exemplary systems for securing wireless networks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for securing wireless networks. As illustrated in this figure, exemplary system 100 may include one or more modules 102 for performing one or more tasks. For example, and as will be explained in greater detail below, exemplary system 100 may include a receiving module 104 that receives, at a physical access point, a request to improve the security of a wireless network that (a) includes at least one client device and (b) is serviced by an active virtual access point running on the physical access point. Exemplary system 100 may also include a configuring module 106 that configures, at the physical access point, a substitute virtual access point to service the wireless network by (a) configuring the substitute virtual access point to identify the wireless network using a substitute SSID and/or (b) configuring the substitute virtual access point to secure the wireless network using a substitute passcode. Exemplary system 100 may further include a transmitting module 108 that transmits a notification that includes the substitute SSID and/or the substitute passcode to the client device that instructs the client device to connect to the wireless network via the substitute virtual access point.

In addition, and as will be described in greater detail below, exemplary system 100 may include a connecting module 110 that connects, at the physical access point, the client device to the wireless network via the substitute virtual access point. Exemplary system 100 may also include a disabling module 112 that disables the active virtual access point. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., access point 202 and/or client device 204), computing system 810 in FIG. 8, and/or portions of exemplary network architecture 900 in FIG. 9. One or more of modules 102 in FIG. 1 may also represent all or portions of one or more special-purpose computers configured to perform one or more tasks.

Figure 2:
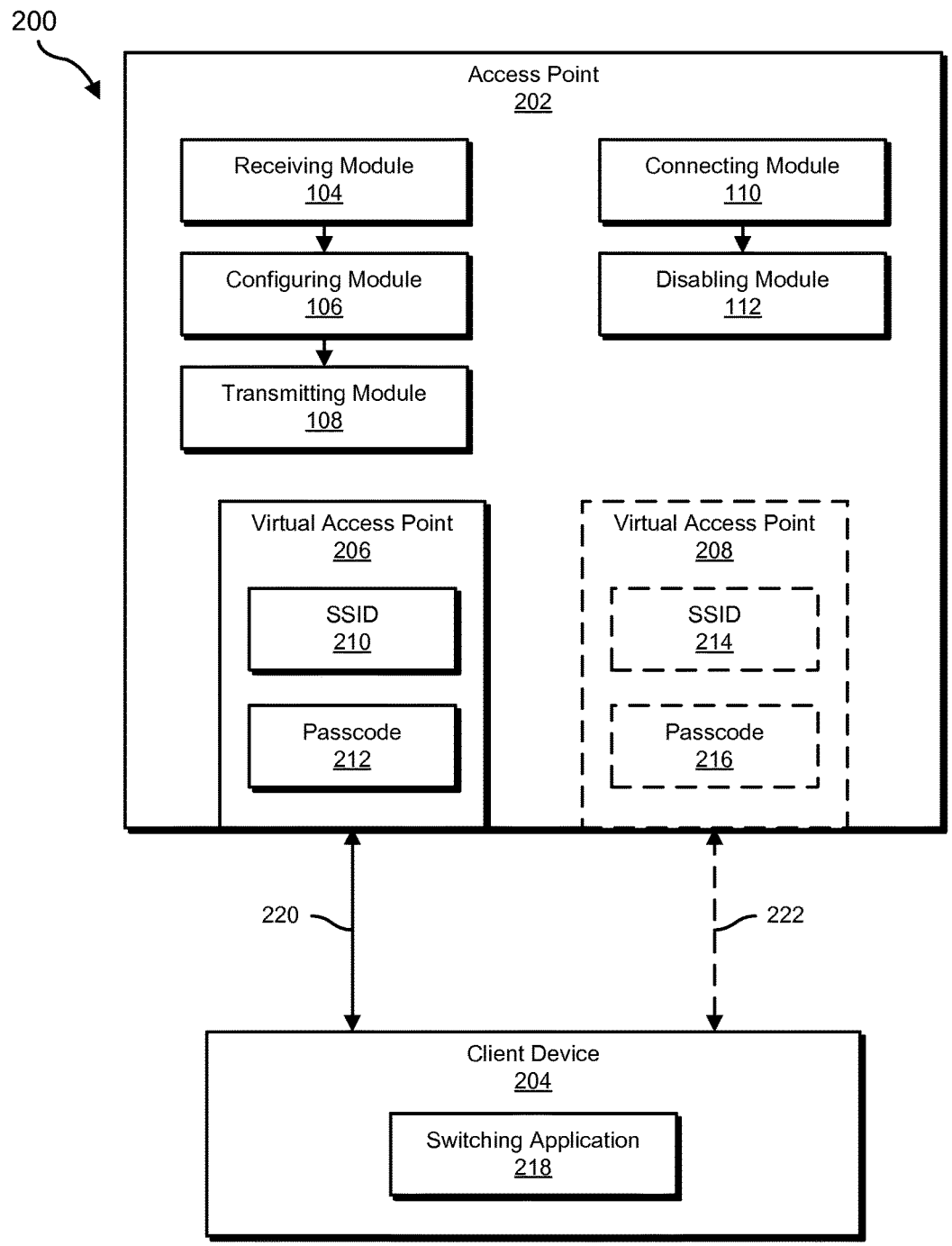
FIG. 2 is a block diagram of an additional exemplary system for securing wireless networks.

Exemplary system 100 in FIG. 1 may be implemented in a variety of ways. For example, all or a portion of exemplary system 100 may represent portions of exemplary system 200 in FIG. 2. As shown in FIG. 2, system 200 may include an access point 202 in communication with a client device 204. In one example, access point 202 may be programmed with one or more of modules 102. Additionally or alternatively, client device 204 may be programmed with one or more of modules 102.

In one embodiment, one or more of modules 102 from FIG. 1 may, when executed by at least one processor of access point 202 and/or client device 204, enable access point 202 and/or client device 204 to secure the wireless network to which client device 204 is connected via connection 220 (e.g., the wireless network serviced by virtual access point 206, identified by SSID 210, and secured by passcode 212). For example, and as will be described in greater detail below, one or more of modules 102 may cause access point 202 to receive a request to improve the security of the wireless network that (a) includes client device 204 and (b) is serviced by virtual access point 206 running on access point 202. In response to the request, one or more of modules 102 may cause access point 202 to configure, at access point 202, virtual access point 208 to service the wireless network by (a) configuring virtual access point 208 to identify the wireless network using a substitute SSID (e.g., SSID 214) and/or (b) configuring virtual access point 208 to secure the wireless network using a substitute passcode (e.g., passcode 216). When virtual access point 208 is configured, one or more of modules 102 may cause access point 202 to transmit a notification that includes SSID 214 and/or passcode 216 to client device 204 that instructs client device 204 to connect to the wireless network via virtual access point 208. One or more of modules 102 may then cause access point 202 to connect client device 204 to the wireless network via virtual access point 208 and disable virtual access point 206.

Access point 202 generally represents any type or form of physical wireless access point that enables a computing device to wirelessly connect to a secured network. In some embodiments, access point 202 may reside within a router, switch, or other network device. In other embodiments, access point 202 may represent a separate physical device. In some embodiments, access point 202 may be capable of running multiple virtual access points (e.g., virtual access points 206 and 208) that share physical resources of access point 202 and may enable client device 204 to wirelessly connect to a secured network via virtual access point 206 and/or virtual access point 208. As used herein, the term "virtual access point" may generally refer to any mechanism that enables a single access point to support multiple SSIDs on a single physical interface, any mechanism that enables client devices to identify and connect to a wireless network using a SSID, and/or any mechanism that secures access to the wireless network using a passcode. In some examples, the term "virtual access point" may refer to a software access point. In general, a virtual access point may have a virtual address (e.g., a virtual Media Access Control (MAC) address), a SSID that is used to identify the wireless network serviced by the virtual access point, and a passcode that secures the wireless network. To the outside world, two virtual access points running on a single physical access point may appear as two physical access points.

As shown in FIG. 2, virtual access point 206 may identify the wireless network of which client device 204 is or has been a member using SSID 210 and may secure the wireless network using passcode 212. Similarly once configured and enabled, virtual access point 208 may identify the wireless network of which client device 204 is or has been a member using SSID 214 and may secure the wireless network using passcode 216. As used herein, the term "wireless network" generally refers to any medium or architecture capable of facilitating communication or data transfer between two or more physical or virtual devices that may be identified using a SSID and that may be secured using a passcode. In at least one example, the term "wireless network" may refer to a Wi-Fi network. In some examples, the term "wireless network" may refer to a Basic Service Set (BSS) or an Extended Service Set (ESS). In at least one example, the term "wireless network" may refer to a collection of wirelessly connected devices.

Client device 204 generally represents any type or form of computing device capable of reading computer-executable instructions. Examples of client device 204 include, without limitation, smart phones, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device. As shown in FIG. 2, client device 204 may include a switching application 218. In some examples, switching application 218 may represent an application running on client device 204 that (1) listens for and receives switching notifications from access point 202 that instruct switching application 218 to connect client device 204 to a wireless network through a new virtual access point, (2) determines when to switch client device 204 to the new virtual access point, and/or (3) connects client device 204 to the new virtual access point.

Figure 3:
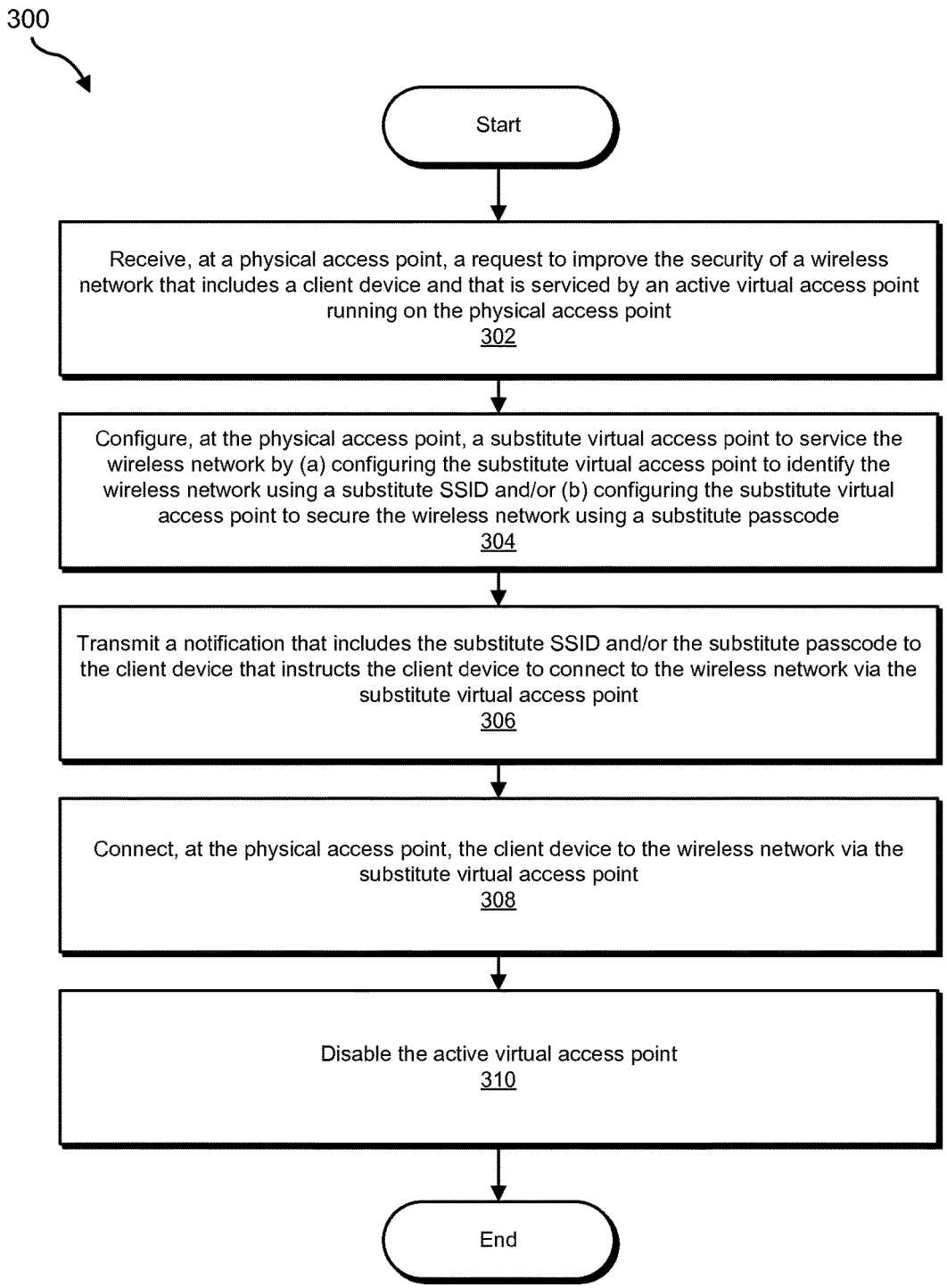
FIG. 3 is a flow diagram of an exemplary method for securing wireless networks.

FIG. 3 is a flow diagram of an exemplary computer-implemented method 300 for securing wireless networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

Figure 4:
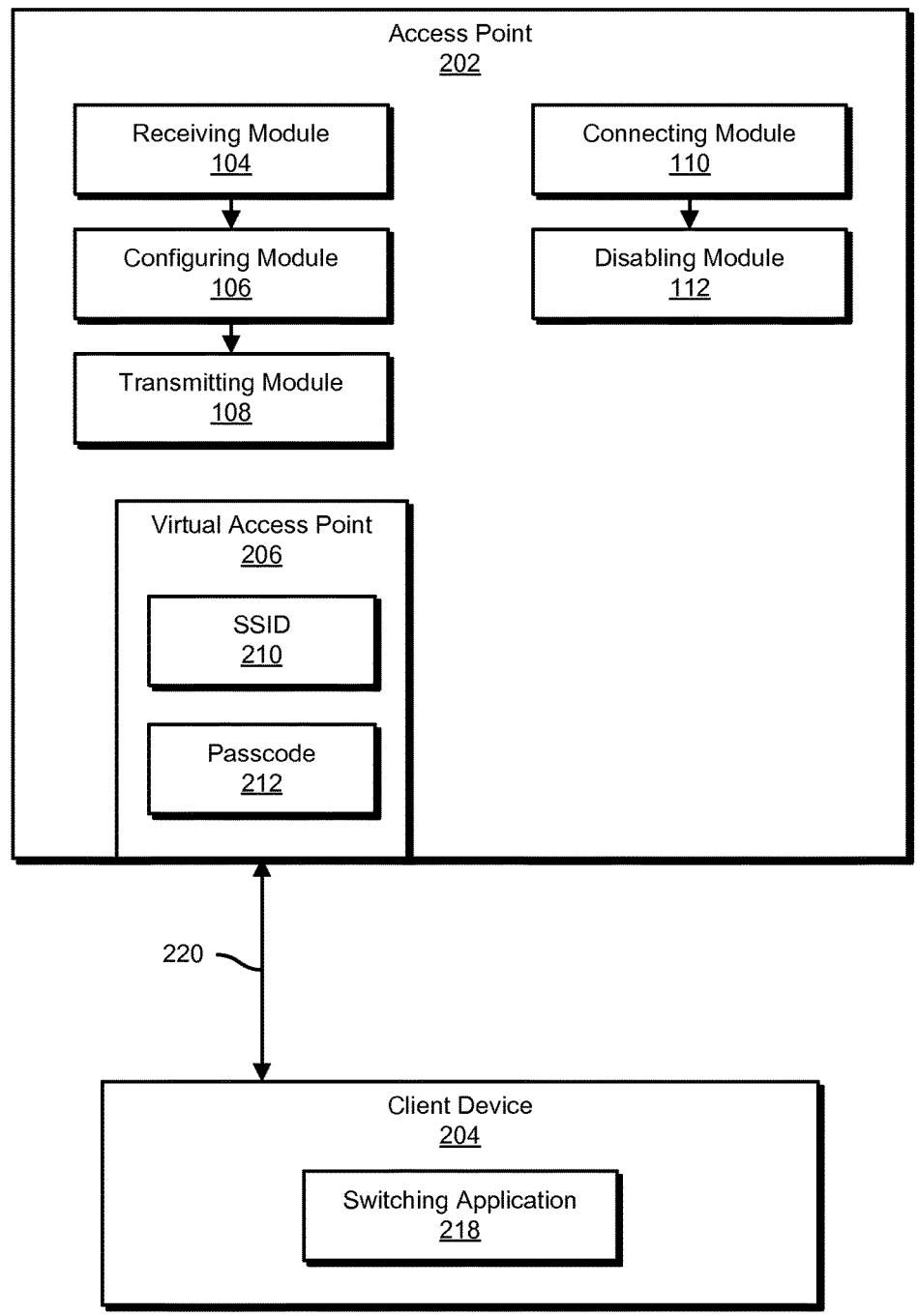
FIG. 4 is a block diagram of an additional exemplary system for securing wireless networks.

As illustrated in FIG. 3, at step 302 one or more of the systems described herein may receive, at a physical access point, a request to improve the security of a wireless network that includes a client device and is serviced by an active virtual access point running on the physical access point. For example, receiving module 104 may, as part of access point 202 in FIG. 2, receive a request to improve the security of the wireless network that includes client device 204 and that is serviced by virtual access point 206 running on access point 202. When receiving module 104 receives the request to improve the security of the wireless network that includes client device 204 and that is serviced by virtual access point 206 running on access point 202, system 200 may be configured as shown in FIG. 4. As shown in FIG. 4, client device 204 may be connected to virtual access point 206 via connection 220, and virtual access point 208 may not exist at this point in time.

The systems described herein may receive requests to improve the security of a wireless network in a variety of ways. For example, receiving module 104 may receive a request to improve the security of a wireless network by receiving a request to change the SSID used to identify the wireless network. Additionally or alternatively, receiving module 104 may receive a request to improve the security of a wireless network by receiving a request to change a passcode used to secure the wireless network.

In some examples, receiving module 104 may receive a request to change the SSID used to identify a wireless network and/or a request to change a passcode used to secure the wireless network from an administrator or a user of the wireless network. In some examples, receiving module 104 may automatically receive a request to change a SSID used to identify a wireless network in response to a determination that a predetermined amount of time has passed since an active virtual access point that services the wireless network was configured to identify the wireless network using the SSID. Similarly, receiving module 104 may automatically receive a request to change a passcode used to secure the wireless network in response to a determination that a predetermined amount of time has passed since the active virtual access point was configured to secure the wireless network using the passcode. Additionally or alternatively, receiving module 104 may receive a request to change the SSID used to identify a wireless network and/or a request to change a passcode used to secure the wireless network automatically in response to the detection of abnormal behavior on the wireless network.

Figure 5:
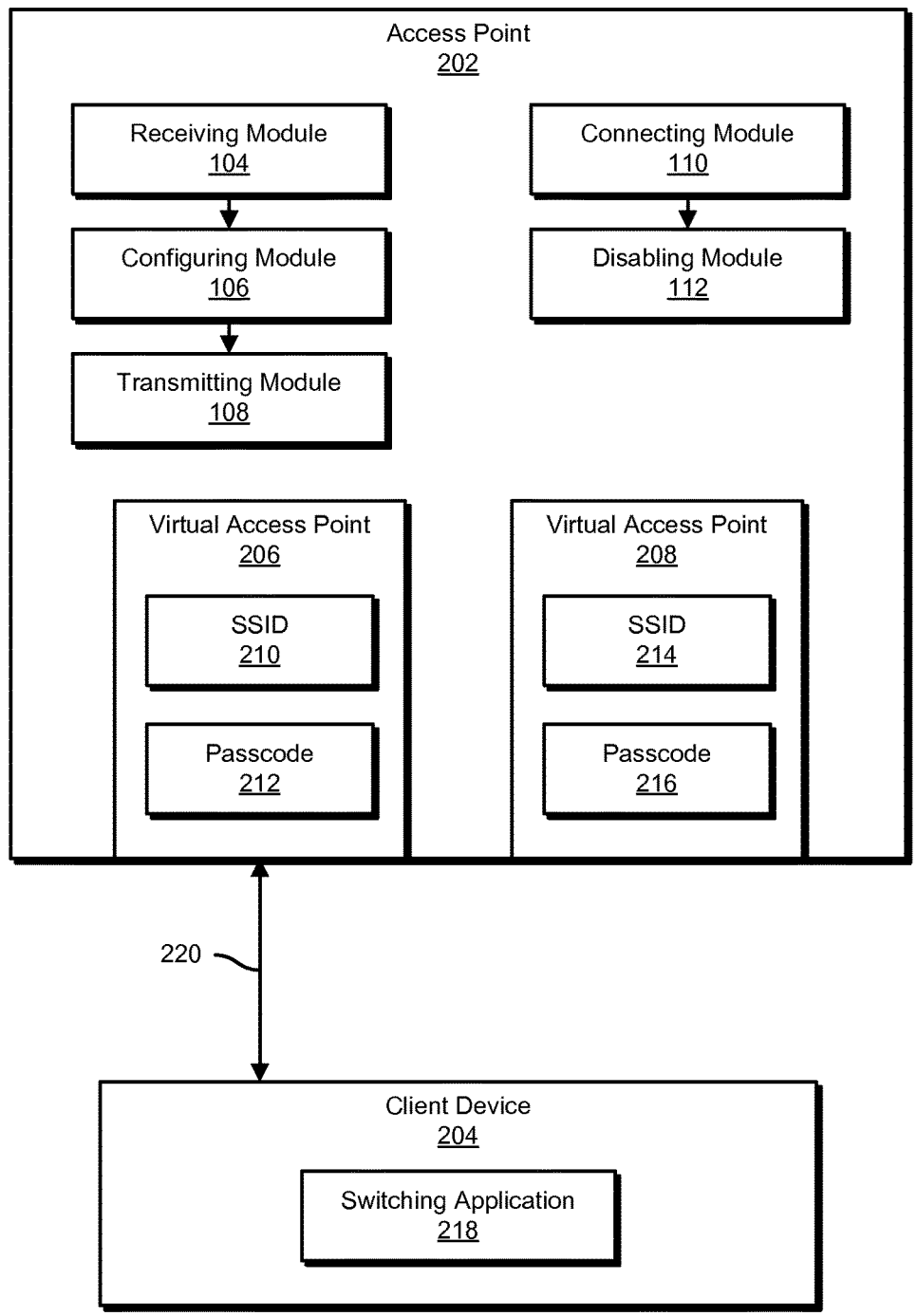
FIG. 5 is a block diagram of an additional exemplary system for securing wireless networks.

At step 304, one or more of the systems described herein may configure, at the physical access point, a substitute virtual access point to service the wireless network by (a) configuring the substitute virtual access point to identify the wireless network using a substitute SSID and/or (b) configuring the substitute virtual access point to secure the wireless network using a substitute passcode. For example, configuring module 106 may, as part of access point 202 in FIG. 2, configure virtual access point 208 to service the wireless network that includes client device 204 by configuring virtual access point 208 to (a) identify the wireless network using SSID 214 and/or secure the wireless network using passcode 216. After configuring module 106 has configured virtual access point 208, system 200 may be configured as shown in FIG. 5. As shown in FIG. 5, client device 204 may still be connected to virtual access point 206 via connection 220, however, virtual access point 208 may exist and be configured to use SSID 214 and passcode 216.

The systems described herein may configure a substitute virtual access point to service a wireless network in a variety of ways. For example, configuring module 106 may create a substitute virtual access point to service the wireless network and then may configure the substitute virtual access point to (1) identify the wireless network using a new substitute SSID instead of the old SSID that had been used to identify the wireless network and (2) secure the wireless network using a new substitute passcode instead of the old passcode that had been used to secure the wireless network. In another example, configuring module 106 may configure the substitute virtual access point to (1) identify the wireless network using the new substitute SSID instead of the old SSID but (2) secure the wireless network using the old passcode. In other examples, configuring module 106 may configure the substitute virtual access point to (1) identify the wireless network using the old SSID but (2) secure the wireless network using the new substitute passcode instead of the old passcode.

As will be explained below, the systems and methods disclosed herein may securely transmit the SSID and passcode of a newly created virtual access point to the client devices that will connect to it. Since the SSID of the newly created virtual access point is given to the client devices, the client devices may not need to scan for the SSID, and configuring module 106 may configure the newly created virtual access point to not broadcast its SSID in an unencrypted state. By disabling the broadcasting of a substitute virtual access point's SSID, the systems and methods disclosed may further improve the security of the wireless network serviced by the substitute virtual access point.

At step 306, one or more of the systems described herein may transmit a notification that includes the substitute SSID and/or the substitute passcode to the client device that instructs the client device to connect to the wireless network via the substitute virtual access point. For example, transmitting module 108 may, as part of access point 202 in FIG. 2, transmit a notification that includes SSID 214 and/or passcode 216 to client device 204 that instructs client device 204 to connect to virtual access point 208.

The systems described herein may perform step 306 in any suitable manner. In one example, transmitting module 108 may broadcast, via the active virtual access point, notifications to the client devices currently connected to the active virtual access point. In some examples, transmitting module 108 may periodically rebroadcast, via the active virtual access point, notifications to the client devices currently connected to the active virtual access point so that client devices that were not connected to the active virtual access point when switching notifications were previously broadcast may receive a switching notification. Additionally or alternatively, transmitting module 108 may transmit switching notifications to client devices via the Internet. By transmitting switching notifications to client devices via the Internet, transmitting module 108 may ensure that client devices that are not connected to the active virtual access point receive switching notifications. In some examples, the systems and methods disclosed herein may track the client devices that connect to a wireless network via the active virtual access point. In at least one example, the systems and methods disclosed herein may track the client devices that connect to a wireless network via the active virtual access point by maintaining an account for the client device (or a user of the client device) that indicates that the client device should receive switching notifications whenever the SSID or passcode of the wireless network change. In order to protect the security of a new SSID and passcode, transmitting module 108 may transmit encrypted switching notifications to client devices.

In some examples, a switching application (e.g., switching application 218 in FIG. 2) running on each client device may listen for and receive the switching notifications transmitted by transmitting module 108. After the switching application receives a switching notification, the switching application may determine when to connect to the substitute virtual access point identified in the switching notification. In some examples, the switching application may determine to connect a client device to a substitute virtual access point when the client device is not transmitting or receiving network traffic. By waiting until there is little to no network traffic being transmitted and/or received at a client device to transition the client device to a substitute virtual access point, the switching application may minimize the impact the transition so that no packet loss occurs. Additionally or alternatively, the switching application may determine to connect a client device to a substitute virtual access point in response to receiving a switching notification regardless of the current network traffic of the client device.

Figure 6:
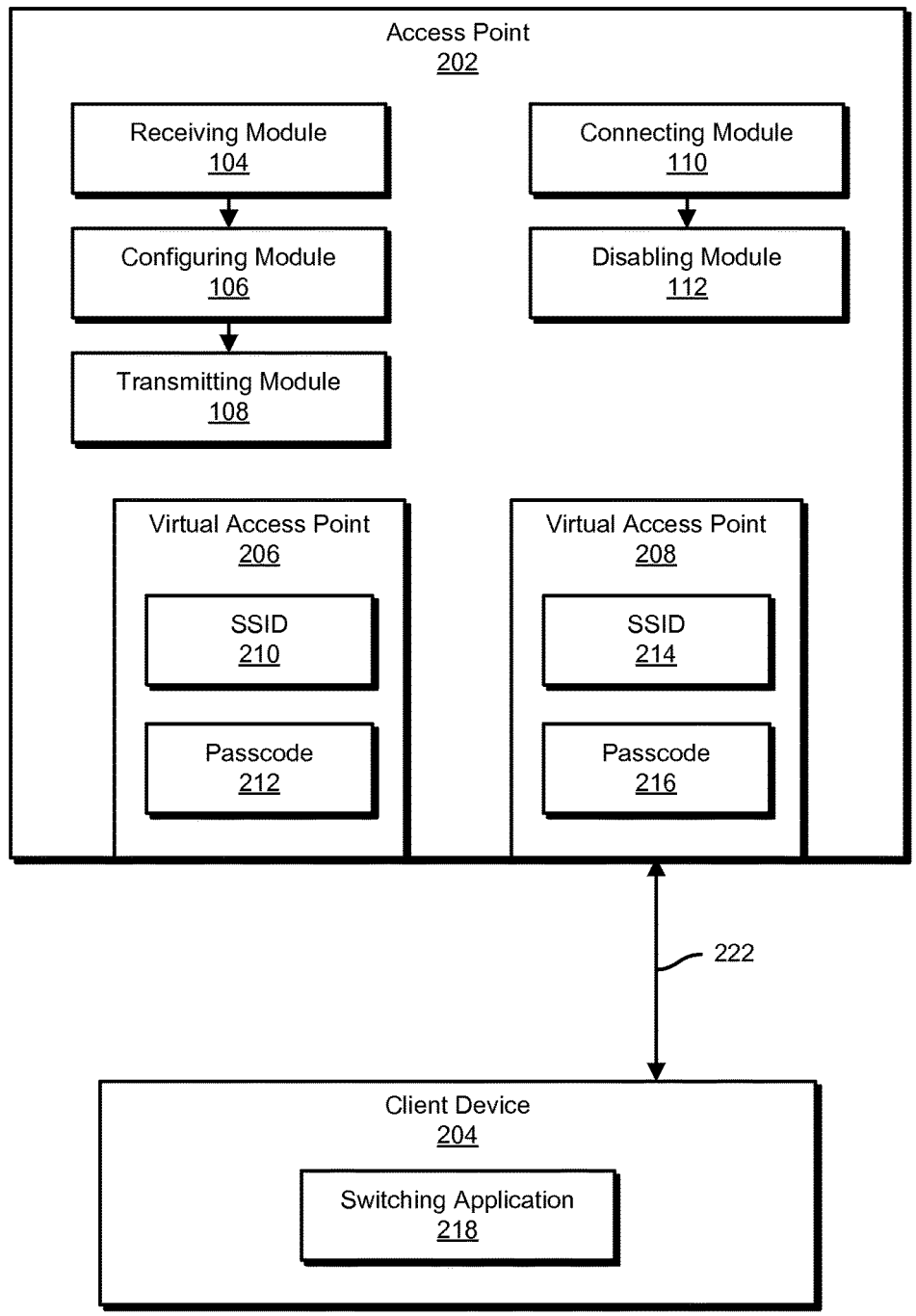
FIG. 6 is a block diagram of an additional exemplary system for securing wireless networks.

At step 308, one or more of the systems described herein may connect, at the physical access point, the client device to the wireless network via the substitute virtual access point. For example, connecting module 110 may, as part of access point 202 in FIG. 2, connect client device 204 to virtual access point 208. After connecting module 110 has connected client device 204 to virtual access point 208, system 200 may be configured as shown in FIG. 6. As shown in FIG. 6, client device 204 may be connected to virtual access point 208 via connection 222, and virtual access point 206 may exist but may not be connected to any client devices.

The systems described herein may perform step 308 in any suitable manner. In some examples, connecting module 110 may connect a client device to a substitute virtual access point in a way that enables the client device to retain the same IP address that the client device had before transitioning to the substitute virtual access point. In at least one example, a switching application running on the client device may cause the client device to use the same IP address.

Figure 7:
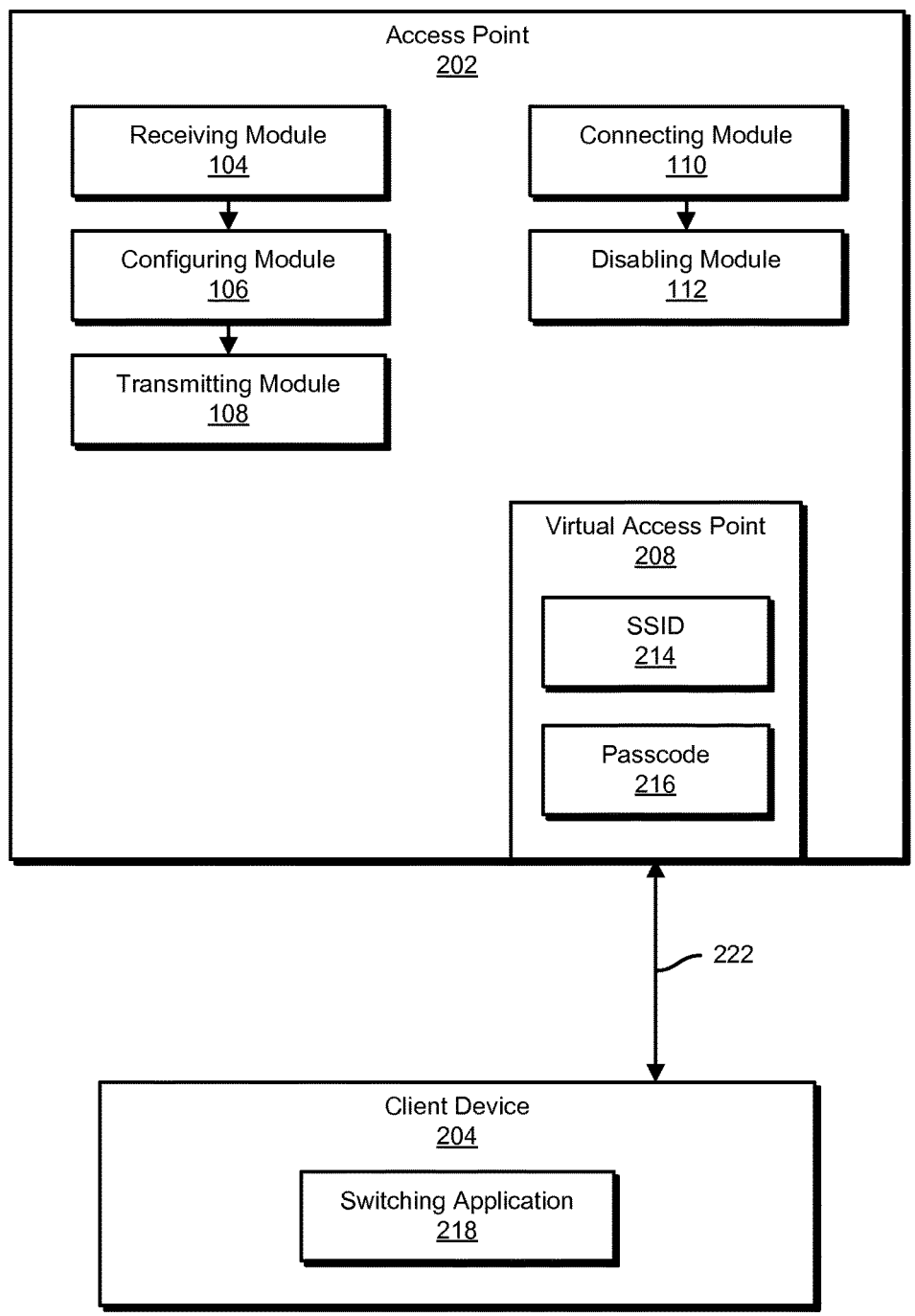
FIG. 7 is a block diagram of an additional exemplary system for securing wireless networks.

At step 310, one or more of the systems described herein may disable the active virtual access point. For example, disabling module 112 may, as part of access point 202 in FIG. 2, disable virtual access point 206. After disabling module 112 has disabled virtual access point 206, system 200 may be configured as shown in FIG. 7. As shown in FIG. 7, client device 204 may be connected to virtual access point 208 via connection 222, and virtual access point 206 may be disabled and may no longer exist.

The systems described herein may perform step 310 in any suitable manner. In some examples, disabling module 112 may disable a virtual access point by deactivating the virtual access point, shutting down the virtual access point, or otherwise preventing network communications to occur via the virtual access point. In some examples, disabling module 112 may disable a virtual access point once some or all of its clients connect to its substitute virtual access point. In some examples, disabling module 112 may keep track of the client devices that were once connected to a virtual access point (e.g., using MAC addresses) and that are now connected to a substitute virtual access point in order to determine when all of a virtual access point's clients have transitioned to the substitute virtual access point.

In at least one example, disabling module 112 may disable a virtual access point once no client devices are connected to the virtual access point and/or once less than a predetermined amount of network traffic is being exchanged via the virtual access point. For example, disabling module 112 may disable a virtual access point once no network traffic is being exchanged via the virtual access point.

In some examples, disabling module 112 may disable a virtual access point at the same time as switching messages are transmitted to its client devices. In at least one example, disabling module 112 may disable a virtual access point after a predetermined amount of time has passed after switching messages are transmitted to its client devices. In this way, disabling module 112 may provide a virtual access point's clients a window of time to transition to a substitute virtual access point. Upon completion of step 310, exemplary method 300 in FIG. 3 may terminate.

Figure 8:
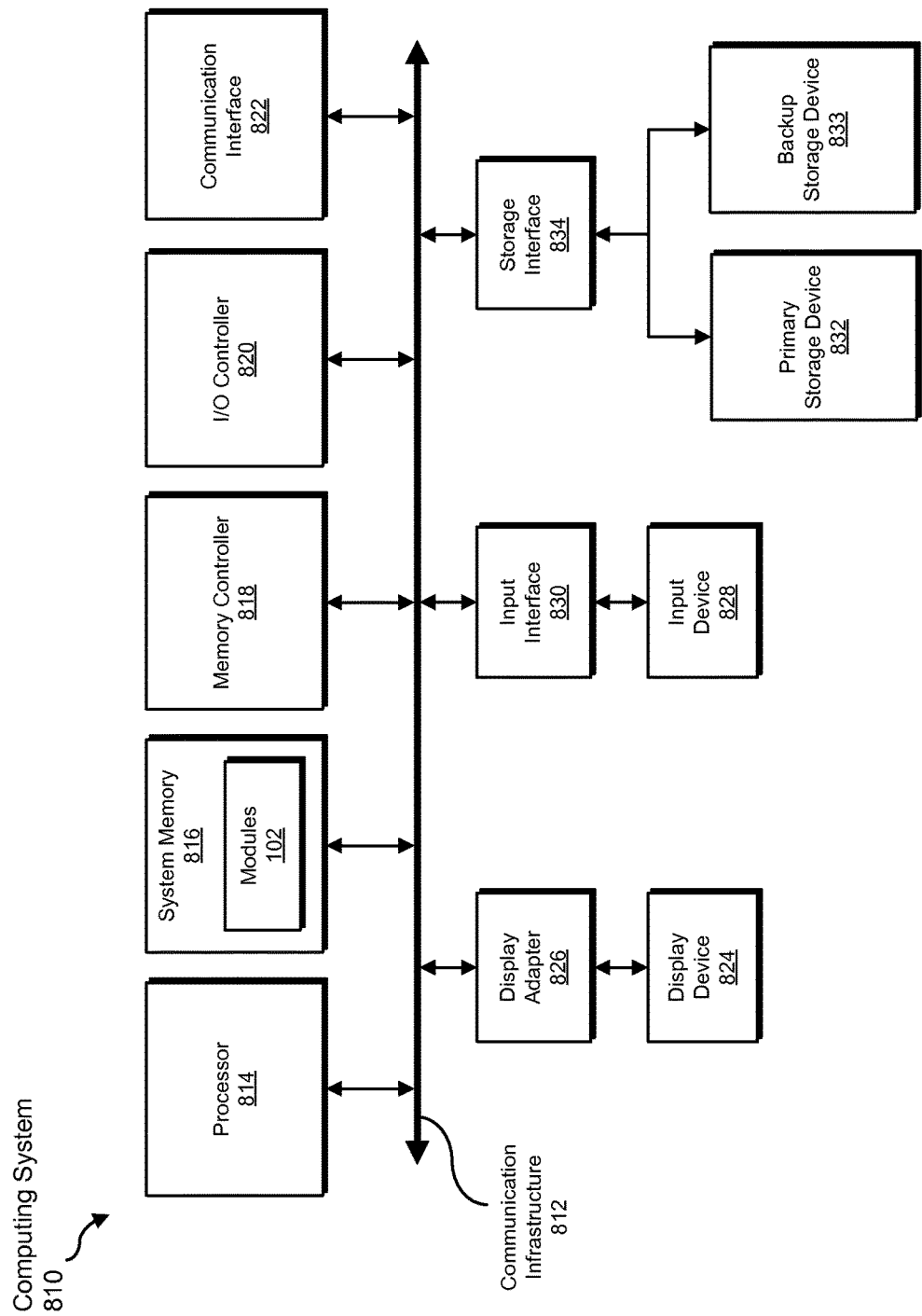
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
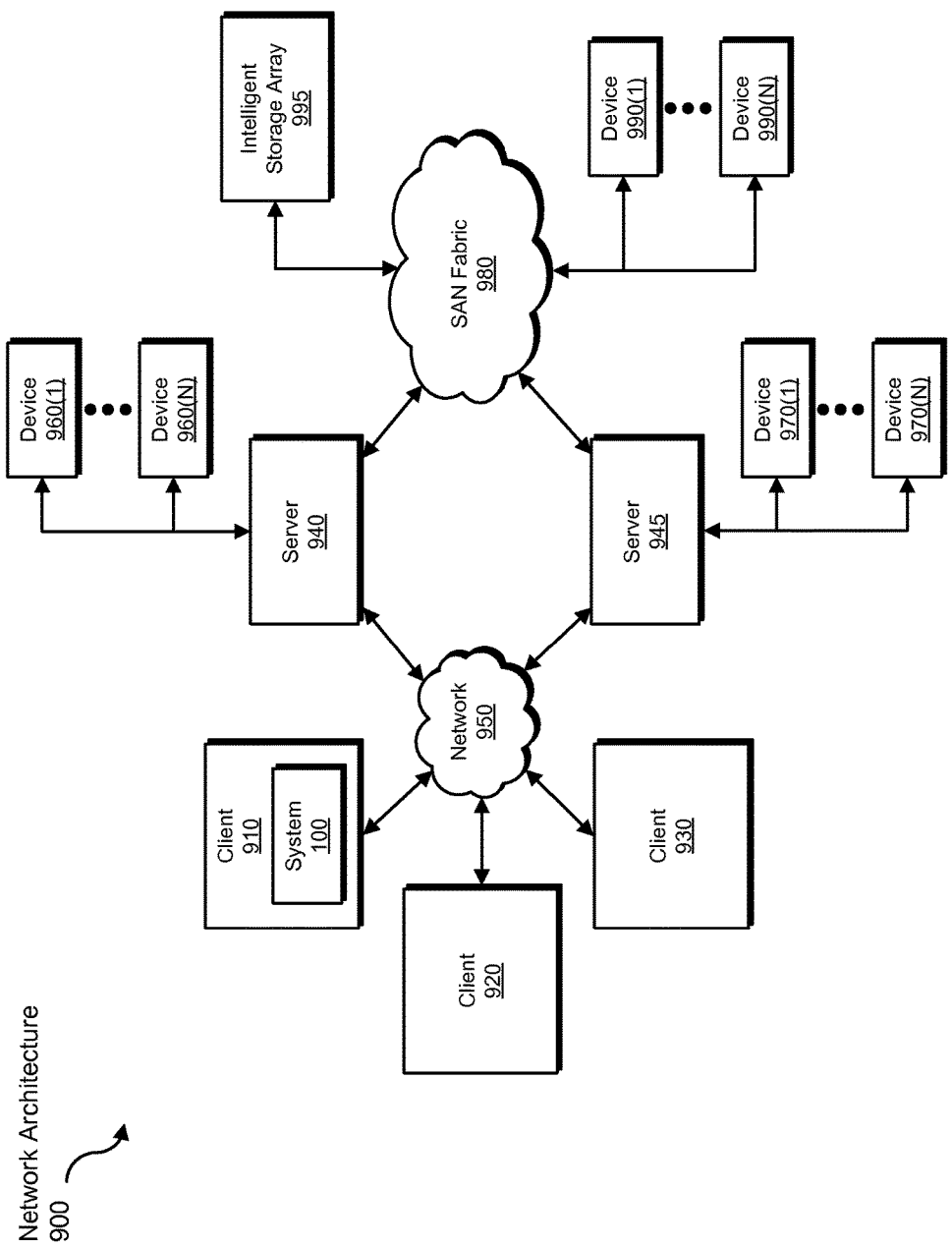
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for securing wireless networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to improve the security of a wireless network that is serviced by an active virtual access point that is configured to identify the wireless network using a SSID and secure the wireless network with a passcode, transform the configuration of the wireless network such that the wireless network is serviced by a substitute virtual access point that is configured to identify the wireless network using a substitute SSID and/or secure the wireless network with a substitute passcode, output a result of the transformation to a physical access point that hosts the active virtual access point and the substitute virtual access point, use the result of the transformation to configure the physical access point to host the substitute virtual access point, and store the result of the transformation to memory of the physical access point. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securing wireless networks, at least a portion of the method being performed by a physical wireless access point comprising at least one physical processor, the method comprising:
   receiving, at the physical wireless access point, a request to improve the security of a wireless network that comprises at least one client device and that is serviced by an active virtual wireless access point running on the physical wireless access point, wherein:
   the physical wireless access point executes one or more virtual wireless access points that share physical resources of the physical wireless access point; and
   the active virtual wireless access point identifies the wireless network using a service set identifier and secures the wireless network using a passcode; and
   improving, in response to receiving the request, the security of the wireless network by:
   configuring, at the physical wireless access point, a substitute virtual wireless access point to service the wireless network, wherein configuring the substitute virtual wireless access point to service the wireless network comprises at least one of:
   configuring the substitute virtual wireless access point to identify the wireless network using a substitute service set identifier; and
   configuring the substitute virtual wireless access point to secure the wireless network using a substitute passcode;
   transmitting a notification to the client device that instructs the client device to connect to the wireless network via the substitute virtual wireless access point, wherein the notification comprises at least one of:
   the substitute service set identifier;
   the substitute passcode;
   connecting, at the physical wireless access point, the client device to the wireless network via the substitute virtual wireless access point; and
   disabling the active virtual wireless access point.

2. The computer-implemented method of claim 1, wherein configuring the substitute virtual wireless access point to service the wireless network comprises:
   configuring the substitute virtual wireless access point to identify the wireless network using the substitute service set identifier instead of the service set identifier;
   configuring the substitute virtual wireless access point to secure the wireless network using the substitute passcode instead of the passcode.

3. The computer-implemented method of claim 1, wherein configuring the substitute virtual wireless access point to service the wireless network comprises:
   configuring the substitute virtual wireless access point to identify the wireless network using the substitute service set identifier instead of the service set identifier;
   configuring the substitute virtual wireless access point to secure the wireless network using the passcode.

4. The computer-implemented method of claim 1, wherein configuring the substitute virtual wireless access point to service the wireless network comprises:
   configuring the substitute virtual wireless access point to identify the wireless network using the service set identifier;
   configuring the substitute virtual wireless access point to secure the wireless network using the substitute passcode instead of the passcode.

5. The computer-implemented method of claim 1, further comprising automatically initiating the request to improve the security of the wireless network in response to detecting abnormal behavior on the wireless network.

6. The computer-implemented method of claim 1, further comprising automatically initiating the request to improve the security of the wireless network in response to determining that a predetermined amount of time has passed since the active virtual wireless access point was configured to identify the wireless network using the service set identifier.

7. The computer-implemented method of claim 1, further comprising automatically initiating the request to improve the security of the wireless network in response to determining that a predetermined amount of time has passed since the active virtual wireless access point was configured to secure the wireless network using the passcode.

8. The computer-implemented method of claim 1, wherein:
   the client device is connected to the wireless network when the notification is transmitted to the client device;
   transmitting the notification to the client device comprises transmitting, via the active virtual wireless access point, the notification to the client device.

9. The computer-implemented method of claim 8, wherein the active virtual wireless access point is disabled after the client device is connected to the substitute virtual wireless access point.

10. The computer-implemented method of claim 1, wherein transmitting the notification to the client device comprises transmitting, via the Internet, the notification to the client device.

11. The computer-implemented method of claim 10, wherein the active virtual wireless access point is disabled before the client device is connected to the substitute virtual wireless access point.

12. The computer-implemented method of claim 1, wherein configuring the substitute virtual wireless access point to service the wireless network comprises configuring the substitute virtual wireless access point to not broadcast the substitute service set identifier in an unencrypted state.

13. A system for securing wireless networks, the system comprising:
   a receiving module, stored in memory, that receives, at a physical wireless access point, a request to improve the security of a wireless network that comprises at least one client device and that is serviced by an active virtual wireless access point running on the physical wireless access point, wherein:
   the physical wireless access point executes one or more virtual wireless access points that share physical resources of the physical wireless access point; and
   the active virtual wireless access point identifies the wireless network using a service set identifier and secures the wireless network using a passcode;
   a configuring module, stored in memory, that improves, in response to the request, the security of the wireless network by configuring, at the physical wireless access point, a substitute virtual wireless access point to service the wireless network, wherein configuring the substitute virtual wireless access point to service the wireless network comprises at least one of:
   configuring the substitute virtual wireless access point to identify the wireless network using a substitute service set identifier; and configuring the substitute virtual wireless access point to secure the wireless network using a substitute passcode;

a transmitting module, stored in memory, that transmits a notification to the client device that instructs the client device to connect to the wireless network via the substitute virtual wireless access point, wherein the notification comprises at least one of:

the substitute service set identifier;

the substitute passcode;

a connecting module, stored in memory, that connects, at the physical wireless access point, the client device to the wireless network via the substitute virtual wireless access point;

a disabling module, stored in memory, that disables the active virtual wireless access point; and at least one hardware processor that executes the receiving module, the configuring module, the transmitting module, the connecting module, and the disabling module.

14. The system of claim 13, wherein the configuring module configures the substitute virtual wireless access point to service the wireless network by:

configuring the substitute virtual wireless access point to identify the wireless network using the substitute service set identifier instead of the service set identifier;

configuring the substitute virtual wireless access point to secure the wireless network using the substitute passcode instead of the passcode.

15. The system of claim 13, wherein the configuring module configures the substitute virtual wireless access point to service the wireless network by:

configuring the substitute virtual wireless access point to identify the wireless network using the substitute service set identifier instead of the service set identifier;

configuring the substitute virtual wireless access point to secure the wireless network using the passcode.

16. The system of claim 13, wherein the configuring module configures the substitute virtual wireless access point to service the wireless network by:

configuring the substitute virtual wireless access point to identify the wireless network using the service set identifier;

configuring the substitute virtual wireless access point to secure the wireless network using the substitute passcode instead of the passcode.

17. The system of claim 13, wherein the receiving module receives the request to improve the security of the wireless network by detecting abnormal behavior on the wireless network.

18. The system of claim 13, wherein the receiving module receives the request to improve the security of the wireless network by determining that a predetermined amount of time has passed since the active virtual wireless access point was configured to identify the wireless network using the service set identifier.

19. The system of claim 13, wherein the receiving module receives the request to improve the security of the wireless network by determining that a predetermined amount of time has passed since the active virtual wireless access point was configured to secure the wireless network using the passcode.

20. A non-transitory computer-readable medium comprising one or more computer-executable instructions that, when executed by at least one physical processor of a computing device, cause the computing device to:

receive, at a physical wireless access point, a request to improve the security of a wireless network that comprises at least one client device and that is serviced by an active virtual wireless access point running on the physical wireless access point, wherein:

the physical wireless access point executes one or more virtual wireless access points that share physical resources of the physical wireless access point; and the active virtual wireless access point identifies the wireless network using a service set identifier and secures the wireless network using a passcode; and improve, in response to receiving the request, the security of the wireless network by:

configuring, at the physical wireless access point, a substitute virtual wireless access point to service the wireless network, wherein configuring the substitute virtual wireless access point to service the wireless network comprises at least one of:

configuring the substitute virtual wireless access point to identify the wireless network using a substitute service set identifier; and configuring the substitute virtual wireless access point to secure the wireless network using a substitute passcode;

transmitting a notification to the client device that instructs the client device to connect to the wireless network via the substitute virtual wireless access point, wherein the notification comprises at least one of:

the substitute service set identifier;

the substitute passcode;

connecting, at the physical wireless access point, the client device to the wireless network via the substitute virtual wireless access point; and disabling the active virtual wireless access point.

* * * * *